UNITED STATES PATENT OFFICE.

GILBERT F. HOLLAND, OF BOSTON, MASSACHUSETTS.

COMPOUND FOR PRESERVING FOOD.

SPECIFICATION forming part of Letters Patent No. 229,042, dated June 22, 1880.

Application filed February 28, 1880.

*To all whom it may concern:*

Be it known that I, GILBERT F. HOLLAND, of Boston, of the county of Suffolk and State of Massachusetts, have invented a new and useful improvement in protecting from decay vegetable or animal matters used as articles of food; and I do hereby declare the same to be described as follows.

Properly speaking, my invention is a means of protecting the surfaces of fruits or other articles of food in order to prevent or hinder the action of the ordinary causes of their decay.

It is well known that the apparently spontaneous destruction of fruits may be owing either to the access of atmospheric oxygen to their interior cells or to the germination and development of minute fungous spores which are generally floating in the air, and are liable to collect on and adhere to all surfaces exposed to them.

To obviate these causes of decay I make use of one or more innocuous saline substances, such as will destroy the fungous spores or render them incapable of fructification or development, and in connection therewith I use one or more gummy, mucilaginous, or gelatinous substances, which, on drying or becoming dried, will form an artificial skin or coating, to properly exclude the air from the saline covering or coating and the surface or surfaces covered thereby.

In carrying out my invention I apply to the surface of a fruit or article to be preserved one or more such substances as will destroy, devitalize, or render inactive whatever organic germs may be adhering to or upon such surface, as well as whatever of such germs may subsequently come in contact therewith, for microscopic researches have shown that fermentation and rapid decay are mainly due to the development and fructification of minute spores or germs, such as are generally, if not always, floating in the atmosphere, and are liable to lodge on articles exposed to them.

I am necessarily restricted to such ingredients or saline matters as, while not poisonous or materially injurious to man or other animals, will destroy the vitality of the spores or germs or render them inert. I take care, also, not only to use an agent or agents that will communicate no unpleasant taste or odor to the article or articles to be preserved or protected, but such as may be readily removed therefrom by washing with water.

I have found that there are several saline substances, one or more of which will fulfill the required conditions; but I prefer the sulphate of alumina, either alone or in mixture or combination with an alkaline nitrate—as nitrate of potash or soda, for instance. I dissolve in one gallon of water two ounces of common alum, two ounces of nitrate of potash, and one pound of gum-arabic or dextrine, and in such solution I immerse for a few minutes the article or articles of food to be preserved or protected, after which I remove therefrom such article or articles and dry in the air the saline covering.

Instead of coating the article or articles by immersing such in the solution, I sometimes apply it by means of a brush, and subsequently dry the coating. So, instead of mixing the gum-arabic or dextrine directly with the saline matter or matters, a solution of the latter may first be spread upon the surface or surfaces to be preserved or protected, and when dry may be covered with the solution of gum-arabic or dextrine, the latter serving, when dry, to form an artificial skin or coating which will protect from abrasion the saline coating. It is immaterial whether the gum or dextrine be applied in solution with the saline matter, or the latter first be applied and subsequently be coated or covered with the mucilaginous or gummy matter.

I am aware that some articles of food—as meats, for instance—have heretofore been treated with one or more antiseptic saline substances, the application thereof not having been limited to the surface or surfaces of such article or articles; but in such case no coating of gum-arabic or dextrine, or any equivalent therefor, has been used with or upon the saline matters.

I am also aware that superficial coatings have been applied to articles of food for the simple purpose of excluding air therefrom in order to prevent its oxidizing effects; but such coatings have usually been insoluble in water, and have been applied by means or in manner to communicate an unpleasant odor or taste to the article or articles, such coverings not sufficing to prevent the penetration of organic germs or spores through them and to or into the surfaces to be protected.

I am aware that gelatine and bisulphite of lime and gelatine have been used for the preservation of articles of food, as described in United States Patents Nos. 90,944 and 117,660. I do not claim these substances, nor the methods of applying them to use described in those patents.

What I claim is—

A composition for application to the exterior of articles of food in order to preserve them, the same consisting of sulphate of alumina, nitrate of potassa, and gum-tragacanth or other suitable gum, combined in the proportions and prepared for use in the manner described.

GILBERT F. HOLLAND.

Witnesses:
R. H. EDDY,
W. W. LUNT.